United States Patent Office.

ARTHUR EICHENGRÜN, OF ELBERFELD, GERMANY, ASSIGNOR TO THE FARBENFABRIKEN OF ELBERFELD COMPANY, OF NEW YORK.

CHLORMETHYL SALICYLATE OF THYMOL.

SPECIFICATION forming part of Letters Patent No. 662,116, dated November 20, 1900.

Application filed August 5, 1899. Serial No. 726,261. (No specimens.)

*To all whom it may concern:*

Be it known that I, ARTHUR EICHENGRÜN, doctor of philosophy, chemist, a citizen of Germany, residing at Elberfeld, Germany, (assignor to the FARBENFABRIKEN OF ELBERFELD COMPANY, of New York,) have invented a new and useful Improvement in Pharmaceutical Compounds; and I hereby declare the following to be a clear and exact description of my invention.

In my application, Serial No. 726,259, filed August 5, 1899, I have described a general process for the production of new condensation products from halogenmethylic derivatives of aromotic oxycarbonic acids and phenolic bodies. On using in this process chlormethyl salicylic acid having most probably the formula

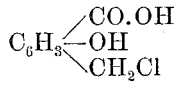

on the one hand and thymol on the other hand a product is obtained which exhibits a specific therapeutical value for the purposes of dental surgery.

In order to produce this compound, I can proceed as follows, the parts being by weight: A mixture prepared from one hundred and fifty parts of thymol and one hundred and ninety parts of chlormethyl salicylic acid is heated at about 100° centigrade until the development of hydrochloric acid which takes place during the reaction has ceased. Subsequently the mixture is allowed to cool. The hard mass thus produced is pulverized and then extracted by means of benzene. Finally it is recrystallized from glacial acetic acid. Thus the new product is obtained in the shape of white needles melting at 250° centigrade.

The new body is easily soluble in alcohol, ether, and acetic ether, insoluble in water, but soluble in dilute alkalies, forming alkaline salts which are soluble in water.

On adding a solution of ferric chlorid $(Fe_2Cl_6)$ to the alcoholic solution of the new compound the solution assumes a blue color.

The new product is a very valuable antiseptic and can be employed either in a free state or in the form of its alkaline salts, which are soluble in water. It is especially fit to be used as an antiseptic in dentistry in the form of a five-per-cent. solution in alcohol.

Having thus described my invention and in what manner the same is to be performed, what I claim as new, and desire to secure by Letters Patent, is—

The new condensation product from chlormethyl salicylic acid and thymol, being in a free state a white cyrstalline powder, melting at 250° centigrade, easily soluble in alcohol, the alcoholic solution assuming a blue color on the addition of ferric chlorid, easily soluble in ether and acetic ether, insoluble in water but dissolving in dilute alkalies forming alkaline salts which are soluble in water, being adapted for use as an antiseptic, substantially as hereinbefore described.

In testimony whereof I have signed my name in the presence of two subscribing witnesses.

ARTHUR EICHENGRÜN.

Witnesses:
R. E. JAHN,
OTTO KÖNIG.